(12) United States Patent
Ishibashi

(10) Patent No.: US 6,558,050 B1
(45) Date of Patent: May 6, 2003

(54) HUMAN BODY-MOUNTED CAMERA

(75) Inventor: Kenji Ishibashi, Izumi (JP)

(73) Assignee: Minolta Co., Ltd., Osaka (JP)

( * ) Notice: Subject to any disclaimer, the term of this patent is extended or adjusted under 35 U.S.C. 154(b) by 98 days.

(21) Appl. No.: 09/620,944

(22) Filed: Jul. 21, 2000

(30) Foreign Application Priority Data

Jul. 23, 1999 (JP) ............................................ 11-208367

(51) Int. Cl.[7] .............................. G03B 17/00; G03B 7/26
(52) U.S. Cl. ........................ 396/420; 396/51; 396/303; 396/312; 396/429; 348/158; 348/333.03; 352/1; 352/131
(58) Field of Search ........................ 396/51, 287, 301, 396/302, 303, 311, 312, 420, 427, 428, 429, 50, 58; 348/114, 115, 143, 157, 158, 375, 376, 552, 333.03; 352/1, 25, 131; 345/8

(56) References Cited

U.S. PATENT DOCUMENTS

| | | | | |
|---|---|---|---|---|
| 2,369,829 A | * | 2/1945 | Johnson | 224/181 |
| 4,797,736 A | * | 1/1989 | Kloots et al. | 348/370 |
| 5,610,678 A | * | 3/1997 | Tsuboi et al. | 348/341 |
| 5,734,421 A | * | 3/1998 | Maguire | 345/8 |
| 5,822,636 A | * | 10/1998 | Cho | 396/420 |
| 5,841,409 A | | 11/1998 | Ishibashi et al. | 345/8 |
| 5,886,739 A | * | 3/1999 | Winningstad | 348/115 |
| 6,198,394 B1 | * | 3/2001 | Jacobsen et al. | 340/10.1 |
| 6,224,227 B1 | * | 5/2001 | Klootz | 348/370 |
| 6,307,589 B1 | * | 10/2001 | Maquire | 345/8 |
| 6,337,954 B1 | * | 1/2002 | Soshi et al. | 349/142 |

FOREIGN PATENT DOCUMENTS

| | | |
|---|---|---|
| JP | 63-284529 A | 11/1988 |
| JP | 03-289893 A | 12/1991 |
| JP | 08-046848 A | 2/1996 |
| JP | 09-065188 A | 3/1997 |

* cited by examiner

Primary Examiner—Alan A. Mathews
(74) Attorney, Agent, or Firm—Sidley Austin Brown & Wood LLP

(57) ABSTRACT

The camera, which is put on a user, shoots and processes image into image data and records the same. The camera has two or more operation modes and is provided with a detector for detecting either the motion state or the physiological state of the user or both of them and a controller for selecting one mode from among the operation modes on the basis of the detection results by the detector.

23 Claims, 9 Drawing Sheets

HUMAN BODY-MOUNTED CAMERA

This application is based on application No. H11-208367 filed in Japan on Jul. 23, 1999, the entire contents of which are hereby incorporated by reference.

BACKGROUND OF THE INVENTION

1. Field of the Invention

The present invention relates to a camera that is mounted on the human body to shoot a moving object.

2. Description of the Prior Art

Cameras which are put on such a part of the human body as the head to record images and voice and sound are disclosed in Japanese Laid-Open Patent Applications Nos. H9-65188, H8-46848, S63-284529, H3-289893. Those cameras permit recording images and voice and sound without taking the trouble to manually level the camera at an object.

However, problems with those cameras are that it is difficult to run the camera for a long time because of limited power and memory capacity. A larger battery could be mounted, but that would boost the costs and increase the size. A larger memory could also be used, but that, too, would increase the costs and it would take long to pick out a desired scene in playback.

If it is possible to run the camera for a long time, the images and voice and sound recorded by the camera will be very helpful to the wearer in recalling details of the past developments such as, for example, who he met, what he did and where he put what. Furthermore, the recording is useful in analyzing the behaviors of the wearer to find out what and how he saw and how he reacted on seeing that.

SUMMARY OF THE INVENTION

In view of the prior art described above, including the disadvantages and deficiencies of the prior art, it is an object of the present invention to provide a camera to be mounted on the human body that permits shooting for a longer time by saving the memory capacity and power consumption and which records information useful for the wearer.

In order to achieve the above-mentioned object, according to one aspect of the present invention, a camera is provided with a shooting unit for shooting an image of an object, the shooting unit worn by a user, a detector for detecting a state of the user automatically, the detector worn by the user, a selector for selecting an operation mode, based on the state detected by the detector, from among a plurality of operation modes provided for controlling the shooting unit, and a controller for controlling the shooting unit based on the operation mode selected by the selector.

According to another aspect of the present invention, a camera is provided with a shooting unit for shooting an image of an object, the shooting unit worn by a user, a processor for processing image data representative of the image shot by the shooting unit, a detector for detecting a state of the user automatically, the detector worn by the user, a selector for selecting an operation mode, based on the state detected by the detector, from among a plurality of operation modes provided for controlling the processor, and a controller for controlling the processor based on the operation mode selected by the selector.

BRIEF DESCRIPTION OF THE DRAWINGS

These and other objects and features of this invention will become clear from the following description, taken in conjunction with the preferred embodiments with reference to the accompanying drawings in which.

DESCRIPTION OF THE PREFERRED EMBODIMENTS

Figure 1:
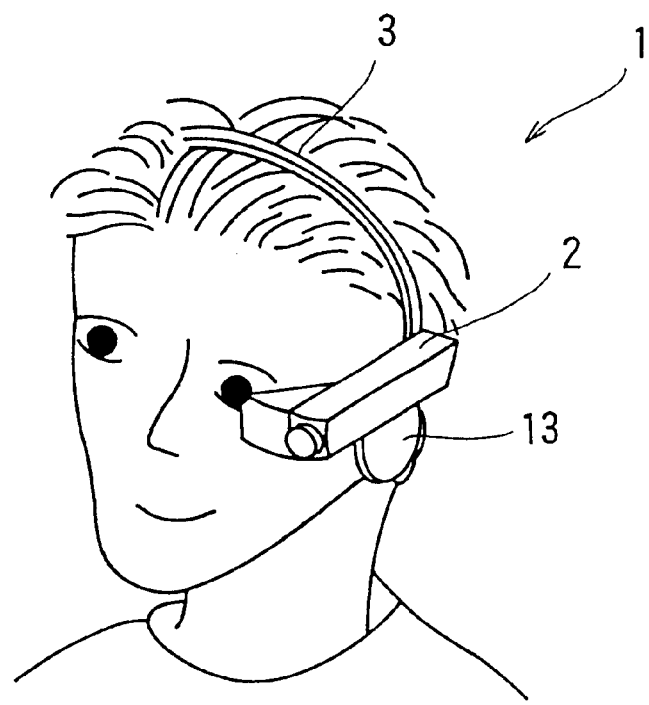
FIG. 1 shows a human body-mounted camera of the present invention which is worn by a user.

Now, the embodiments of the human body-mounted camera according to the present invention will be explained with reference to the drawings. FIG. 1 shows a human body-mounted camera 1 put on a user. The human body-mounted camera 1 is so constructed that the main unit 2 is mounted and fixed on the head by a head set 3. The human body-mounted camera 1 is provided with a plurality of apparatuses to make various measurements to detect the motion state and physiological state of the wearer, i.e., the user. Shown in FIG. 1 is only a pulse rate-body temperature measuring unit 13 to measure the pulse rate and the body temperature, and the other apparatuses are not shown.

Figure 2:
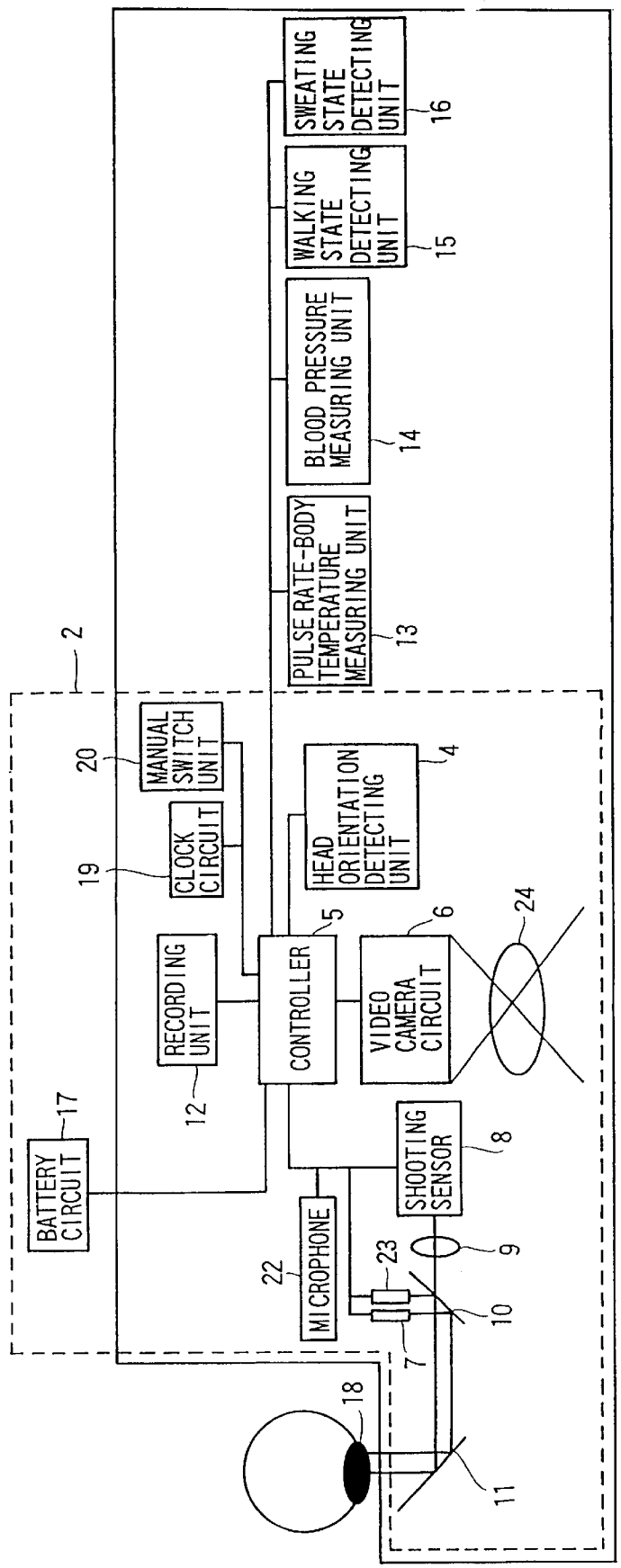
FIG. 2 is a block diagram of the human body-mounted camera of the present invention.

FIG. 2 is a block diagram of the human body-mounted camera 1. The controller 5 controls the operation of the human body-mounted camera 1. The video camera circuit 6 senses light coming from the object through the shooting lens 24 and sends out image data to the controller 5. The head orientation detecting unit 4 detects three-dimensional angular positions of the head of the wearer, and sends out measurements to the controller 5. The controller 5 determines the head orientation on the basis of those measurements and works out the quantity of change in head orientation. The head orientation detecting unit 4 can be materialized, for example, by the apparatus disclosed in U.S. Pat. No. 5,841,409 issued to the applicant of the present invention.

The microphone 22 takes in sounds around the wearer and voices of the wearer, too. The data thus taken in are sent out to the controller 5. Using this data, the controller 5 checks whether the wearer is speaking or not.

The infrared LED illuminator 23 is used for detection of the direction of line of sight and sheds light to the pupil 18 through the half mirrors 10, 11. The reflected light enters the shooting sensor 8 through the half mirrors 11, 10 and the lens 9. Then, the image data is sent out to the controller 5. On the basis of the position of the reflected light entering the shooting sensor 8, the controller 5 detects the direction of line of sight and works out the quantity of change in the direction of line of sight.

The shooting sensor 8 shoots the pupil 18 of the wearer when the infrared LED illuminator 23 does not emit light. The image data is sent out to the controller 5. Using these results, the controller 5 detects the diameter of the pupil 18 of the wearer by image processing and works out the quantity of change in the pupil diameter. The shooting mode indicator LED 7 can display two colors—red and green. The displayed color is given to the pupil 18 through the half mirrors 10, 11. The shooting mode indicator LED 7 displays a color according to the shooting mode that will be described later. By this color, the wearer can know the current shooting mode.

The controller 5 gives predetermined treatments to image data from the video camera circuit 6 and audio data from the microphone 22. The treated data are recorded in the recording unit 12. The recording unit 12 is formed of hard disk.

The clock circuit 19 is connected to the controller 5. On the basis of signals from the clock circuit 19, the controller records the date and time of shooting in the recording unit 12 along with image data. The manual switch unit 20 is operated by the wearer, and operational information is sent out to the controller 5. By means of the manual switch unit 20, the wearer gives instructions to switch on or off power and sets operation modes. The battery circuit 17 supplies electricity to the whole human body-mounted camera 1. That is a configuration of the circuit within the main unit 2.

There will now be explained the respective units other than the main unit 2. The pulse rate-body temperature measuring unit 13, which is put on the ear of the wearer, measures the pulse rate and body temperature of the wearer. The blood pressure measuring unit 14, which is put on the upper arm, measures the blood pressure. The measurements from the pulse rate-body temperature measuring unit 13 and blood pressure measuring unit 14 are sent out to the controller 5. On the basis of these results, the controller 5 works out the quantity of change in pulse rate, the quantity of change in body temperature and the quantity of change in blood pressure. The walking state detecting unit 15, which is carried on the belt of the wearer, detects vibration. The results are sent out to the controller 5. On the basis of the results, the controller 5 judges if the wearer is walking or not. If vibration is detected, it is judged that the wearer is walking. If no vibration is detected, it is judged that the wearer is not walking.

The sweating state detecting unit 16, which is placed under the armpit, measures the electric conductivity on the skin. The measurements are sent out to the controller 5. On the basis of these results, the controller 5 determines the amount of sweat and works out the quantity of change in the amount of sweat.

Next, the operation of the controller 5 will be explained. There will be described the human body-mounted cameras of first to sixth embodiments which are different in operation of the controller 5. The basic construction and arrangement of the human, body-mounted cameras in the respective embodiments are as described above.

First Embodiment

Figure 3:
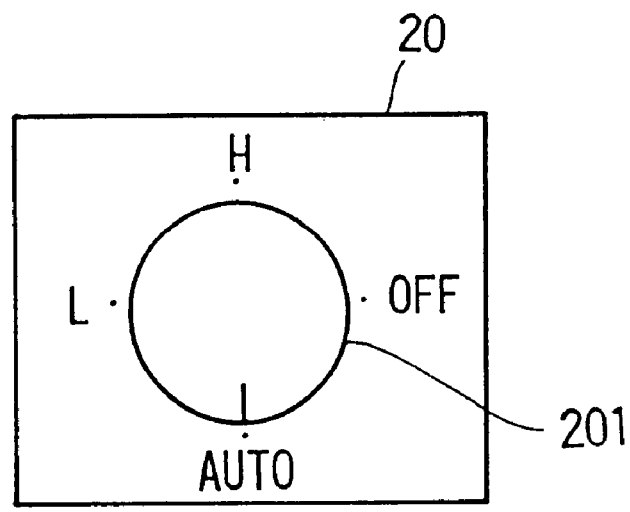
FIG. 3 is an exterior view of a manual switch of a first embodiment of the present invention.

FIG. 3 is an exterior view of the manual switch unit 20 in the first embodiment. The manual switch unit 20 is formed of one rotary switch 201. The rotary switch 201 has four positions—OFF, AUTO, LOW (L) and HIGH (H). With the switch 201 at the OFF position, the operation of the human body-mounted camera 1 is turned off. With the switch 201 at the AUTO position, the operation mode, which will be described later, is automatically set by the controller 5. With the switch 201 at the L or H position, the operation mode is set manually. With the switch 201 at the L position, the mode is set to a low power consumption mode. With the switch 201 at the H position, the mode is set to a high power consumption mode. The manually set low power consumption mode is identical in substance with the automatically set low power consumption mode. The manually set high power consumption mode and the automatically set high power consumption are also the same in substance. Details of the respective modes will be described later.

Figure 4:
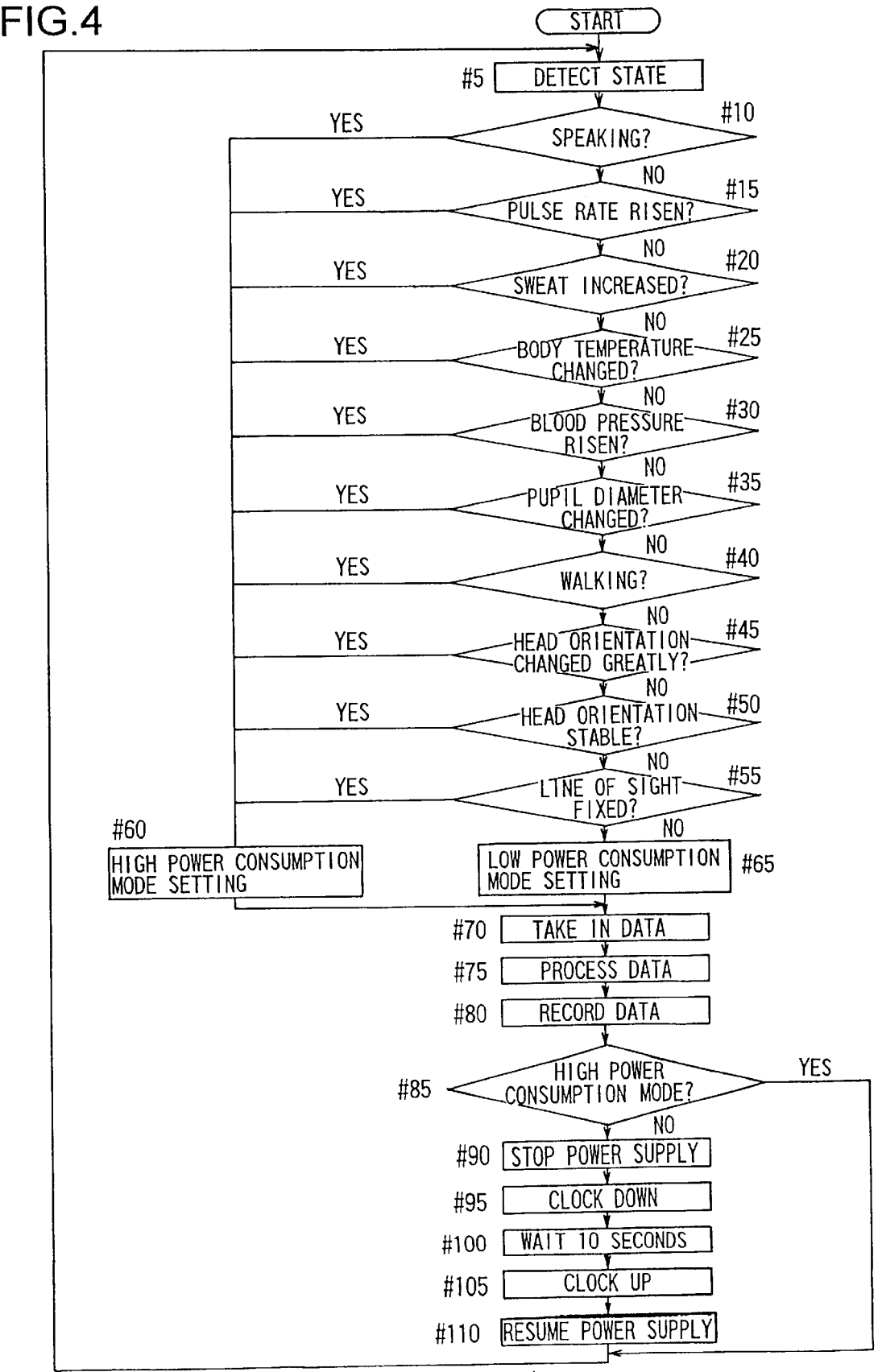
FIG. 4 is a flow chart of operation of a controller of the first embodiment.

FIG. 4 shows a flow chart of the operation of the controller 5 in the present embodiment. When the process starts, the controller 5 first detects the motion state and physiological state of the wearer (step #5). To be specific, the controller 5 detects the states of the wearer on the basis of data sent in from the respective circuits connected to the controller 5. According to the detection results, the following judgements on states of the wearer are made.

That is, it is judged whether the wearer is speaking (step #10), whether the increase in pulse rate is not lower than a predetermined level (step #15), whether the increase in sweating amount is not lower than a predetermined level (step #20), whether the quantity of change in body temperature is not lower than a predetermined level (step #25), whether the increase in blood pressure is not lower than a predetermined level (step #30), whether the quantity of change in pupil diameter is not lower than a predetermined level (step #35), whether the wearer is walking (step #40), whether the quantity of change in head orientation is not lower than a first predetermined level (step #45), whether the quantity of change in head orientation is not higher than a second predetermined level (step #50), whether the quantity of change in direction of line of sight is not higher than a predetermined level (step #55).

In case the result is YES in any of the judgement steps, the operation mode is set to the high power consumption mode (step #60). In case the result is NO in all the judgement steps, the operation mode is set to the low power consumption mode (step #65). In the above-mentioned judgements related to head orientation, the second predetermined level is smaller than the first predetermined level, and is so set that the head can be regarded as being substantially stable if the quantity of change in head orientation is not higher than the second predetermined level.

After the operation mode is set, a shooting instruction is outputted to the video camera circuit 6. After shooting, the image data sent out from the video camera circuit 6 is taken in (step #70). Then, the data is processed (step #75). Here, data is processed and compressed into image data having a preset color resolution (the number of colors in an image) and a preset positional resolution (the number of picture elements in an image. The image data thus processed is recorded in the recording unit 12 (step #80).

Then, it is judged whether the final set operation mode is the high power consumption mode or not (step #85). The expression "final set operation mode" as used herein means a manually set operation mode if the operation mode is set manually and an operation mode set by the controller 5 if the rotary switch 201 is at the AUTO position. This definition is applicable throughout this specification. In case of the high power consumption mode, the process returns to the state detection step (step #5). In case of low power consumption, an instruction to cut off power supply to other than the controller 5 will be outputted to the battery circuit 17 (step

90). After the instruction is carried out, the clock frequency of the controller 5 is lowered (step #95). The controller 5 usually operates on 100 MHZ. The frequency is reduced to 10 kHz. Then, 10 seconds is allowed to wait (step #100). After that, the clock frequency is brought back to normal (step #105), and an instruction is outputted to the battery circuit 17 to resume power supply to each circuit (step #110). After this instruction is carried out, the process returns to the state detection step (step #5).

The controller 5 displays the shooting mode indicator LED 7 in red in the high power consumption mode and makes no display in the low power consumption mode. By that, the wearer can know what the current operation mode is. In case need arises to set the mode to other than the automatically set operation mode, the wearer can manually set the mode by means of the manual switch unit 20.

In case the controller 5 is in the above-mentioned operation state and in case the final set operation mode is the high power consumption mode, the controller 5 records audio data sent out from the microphone 22 in the recording unit 12. In case the final set operation mode is the low power consumption mode, there is no recording of audio data.

In the high power consumption mode, the number of shooting per unit time, that is, the shooting rate is higher than in the low power consumption mode by the amount increased because of absence of waiting time. In other words, image data with a high time density is recorded. In the low power consumption mode, on the other hand, the power supply to other than the controller 5 is cut off, and a waiting time is allowed with the clock frequency lowered, and therefore the power consumption is lower than in the high power consumption mode. Furthermore, since image data recorded is low in time density, the use of memory capacity is also low. In addition, since no audio data is recorded, the use of memory capacity is still lower.

There will be explained the situations where the mode is set to the high power consumption mode, that is, the situations in which the result of judgement becomes YES in any of steps #10 to #55 in the flow chart in FIG. 4. When the results become YES on physiological states (pulse rate, sweating, body temperature, blood pressure and pupil diameter), there is a high possibility that psychological changes are taking place in the wearer. That is because physiological changes are liable to be caused by psychological changes. It is understood that the expression psychological changes include fear, anger, feeling of tension, shyness, surprise and joy. It is highly possible that psychological changes are in turn caused by what he sees (object of observation) and what he hears (object of hearing).

When the results become YES on motion states (speaking condition, head orientation, direction of line of sight, walking condition), there is a high possibility that the object of observation or object of hearing is changing greatly or that the wearer is much interested in the object of observation or object of hearing. As set forth above, there is a high possibility that the object of observation or object of hearing in the situation in which the result of judgement is YES in any of the steps #10 to #55 is highly useful in helping the wearer to remember or as data for behavior analysis. Hereinafter, image data and audio data in such situations shall be referred to as data of high usefulness, and data other than that shall be referred to as data of low usefulness.

In the present embodiment, while image data of high usefulness is recorded with a high time density in the high power consumption mode, data of low usefulness is recorded with a low power consumption and with a low memory capacity in the low power consumption mode, thereby saving the power consumption and memory capacity as a whole. As for audio data, too, though data of high usefulness is recorded with a high tone quality, it is possible to save the memory capacity as a whole.

It is noted that the low power consumption mode may be a non-shooting state where data taking (step #70), data processing (step #75) and data recording (step #80) are not performed. In this case, the power consumption and memory capacity can be further saved. It is also noted that not to record data of low usefulness facilitates retrieval in playback.

Taking a case of Mr. A who goes to a zoo with his children by car on a holiday as an example, there will be described some situations where the results of judgement (steps #10–#55) are YES or can be YES. A conversation with his children is judged as speaking (step #10). If another car suddenly rushes out toward his car from a side road while he is driving, the pulse rate will rise greatly (step #15). If the parking area is narrow and he can not park his car well, the sweat will increase (step #20). At meal, the body temperature can rise (step #25). When an animal he has been looking forward to seeing happens to be sleeping and can not be observed, the blood pressure will rise (step #30). When a big animal suddenly comes up before him, it can be judged, the pupil diameter changed (step #35). When he is walking around to see a variety of animals, it is judged, he is walking (step #40). When he is watching a fast moving animal, it is judged, the change in head orientation is large (step #45). When he is reading a guideboard in the zoo, it is judged, the head orientation is stable (step #50). When he is looking at one of his favorite animals, it is judged, the direction of line of sight is definite (step #55).

In the above-mentioned case, if a dent is found on his car later, it can be found from the images shot with a high shooting rate that the car which rushed out is responsible and what make that car is. Since the shooting rate is high, the images on the guideboard in the zoo are minutely recorded and it can be known from these images on what day the zoo is closed. Furthermore, shot images are useful as data for analysis of the behavior of Mr. A. A variety of scenes—a scene where psychological changes took place in Mr. A, a scene where there was a great change in the object of observation and a scene where he showed much interest in the object of observation—are recorded with a high shooting rate and are desirable as data for analysis of behavior.

Second Embodiment

The manual switch unit 20 in the second embodiment is similar in appearance to that in the first embodiment, but the operation modes manually set at the L and H positions are different from those in the first embodiment. At the L position, the operation is set to a low data volume processing mode, and at the H position, the operation is set to a high data volume processing mode.

Figure 5:
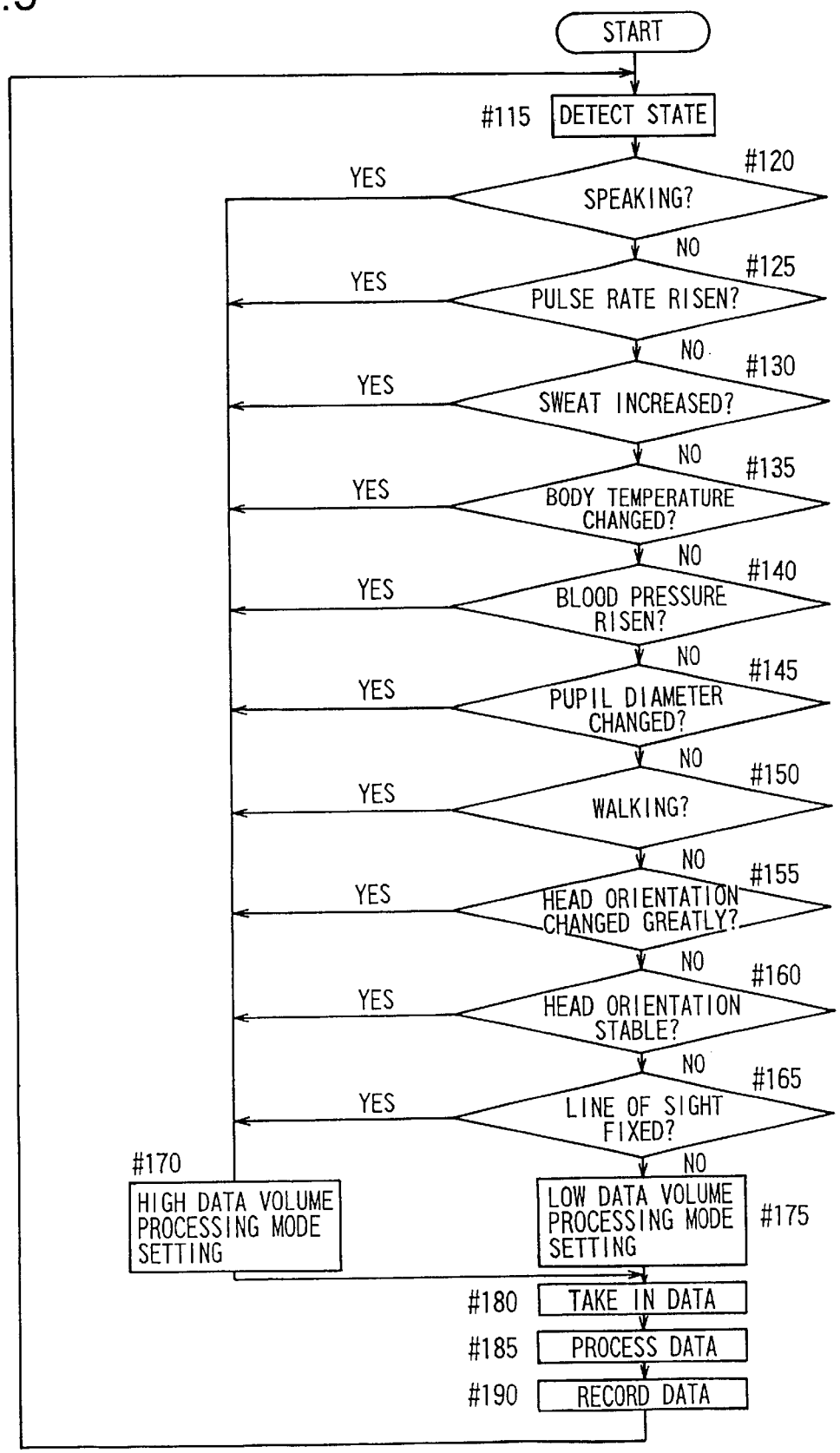
FIG. 5 is a flow chart of operation of a controller of a second embodiment.

FIG. 5 shows the flow chart of operation of the controller 5 in the present embodiment. When the process starts, the controller 5 detects the motion state and physiological state of the wearer (step #115). This step is the same as step #5 in FIG. 4. Then, judgements are made in steps #120 to #165. Those judgement steps are identical with steps #10 to #55 in FIG. 4.

In case the result is YES in any of the judgement steps, the operation mode is set to the high data volume processing mode (step #170). In case the result is NO in all the judgement steps, the operation mode is set to the low data volume processing mode (step #175).

After the setting of the operation mode, an instruction to shoot is outputted to the video camera circuit 6. After shooting, image data sent out from the video camera circuit 6 is taken in (step #180). And data taken in are processed according to the mode set (step #185) and the processed image data is recorded in the recording unit 12 (step #190). After that, the process returns to step #115. The high data volume processing mode is a mode in which the volume of data to be recorded is large, while the low data volume processing mode is a mode in which the volume of data to be recorded is small. The controller 5 displays the shooting mode indicator LED 7 in red for the high data volume processing mode and in green for the low data volume processing mode, thereby letting the wearer to know what is the current operation mode (final set operation mode).

Figure 6:
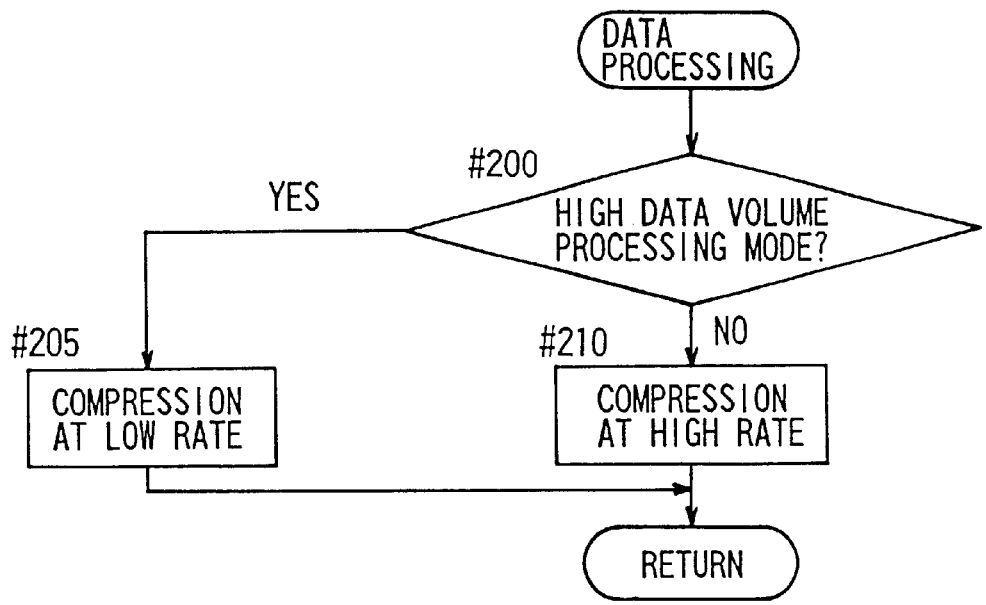
FIG. 6 is a flow chart of data processing operation of the controller of the second embodiment.

FIG. 6 shows the flow chart of data processing in step #185 in FIG. 5. When data processing starts, the final set operation mode is first judged (step #200). In case the mode is set to the high data volume processing mode, data is compressed at a low compression rate (step #205). In case the mode is set to the low data volume processing mode, data is compressed at a high compression rate (step #210). Here, the compression rate is defined as a value obtained by dividing the volume of data before compression by the volume of data after compression. Thus, compressing data at a higher rate results in a smaller data volume. In either mode, data is processed on the basis of preset conditions as to the color resolution, positional resolution, recording rate and others, except for the compression rate. After processing, data is recorded in the step #190 in FIG. 5.

Third Embodiment

Figure 7:
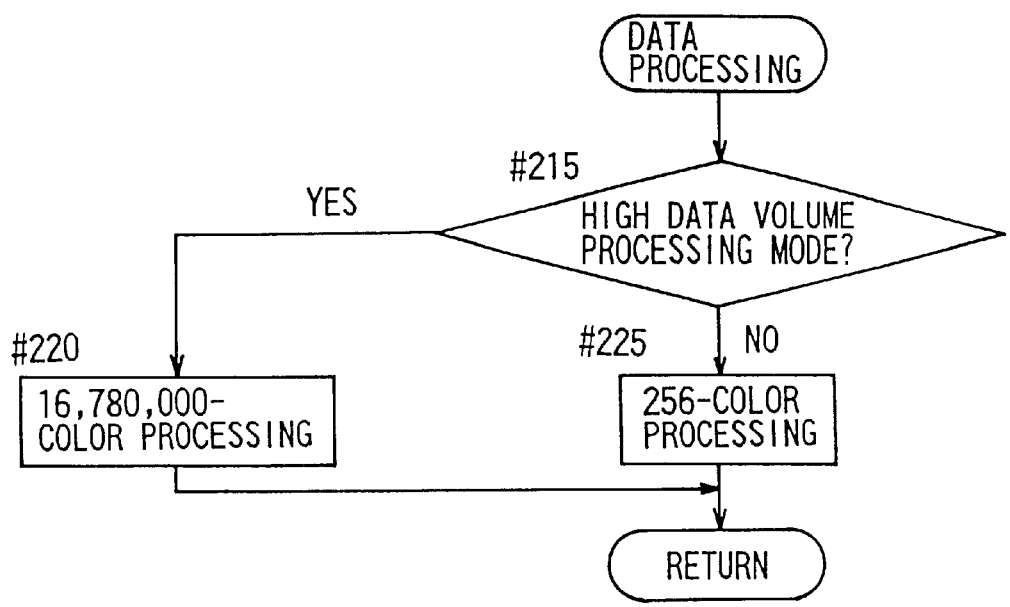
FIG. 7 is a flow chart of data processing operation of a controller of a third embodiment.

The third embodiment is identical with the second embodiment except for the data processing operation of the controller 5 (step #185 in FIG. 5). FIG. 7 shows the flow chart of the data processing.

When the data processing start, the final set operation mode is first judged (step #215). In case the mode is set to the high data volume processing mode, image data is processed into 16,780,000-color data capable of representing the same number of colors (step #220). In case the mode is set to the low data volume processing mode, image data is processed into 256-color data capable of representing the same number of colors (step #225). In either mode, data is processed on the basis of preset conditions except for the color resolution. After processing, data is recorded at step #190 in FIG. 5.

Fourth Embodiment

Figure 8:
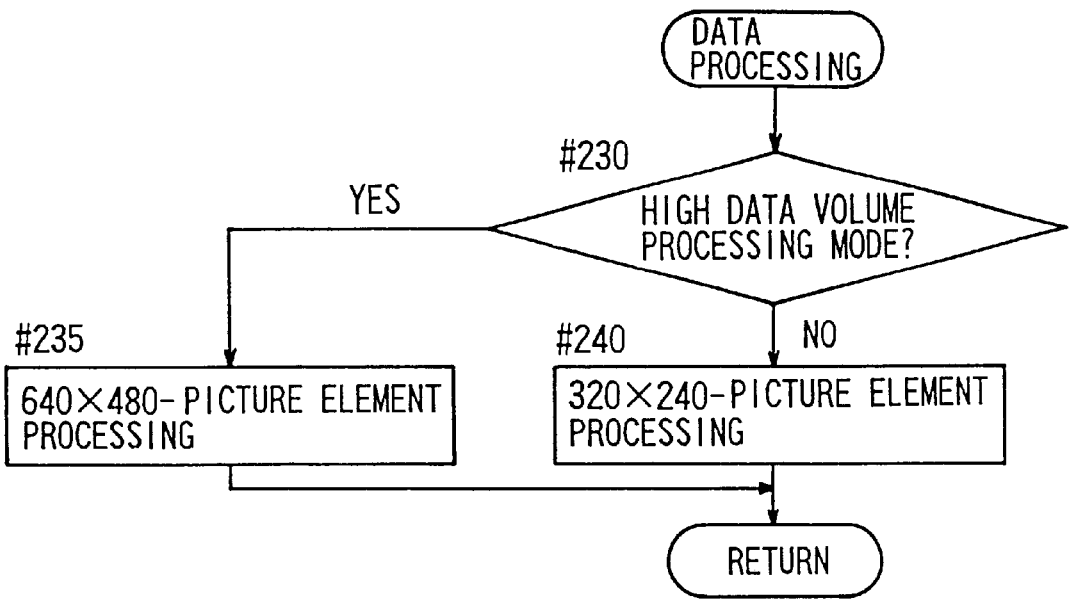
FIG. 8 is a flow chart of data processing operation of a controller of a fourth embodiment.

The fourth embodiment is the same as the second embodiment except for the data processing of the controller 5 (step #185 in FIG. 5). The flow chart of data processing is shown in FIG. 8.

When data processing starts, the final set operation mode is first judged (step #230). In case the mode is set to the high data volume processing mode, image data is processed into data with 640×480 picture elements (step #235). In case the mode is set to the low data volume processing mode, image data is processed into data with 320×240 picture elements (step #240). In either mode, data is processed on the basis of preset conditions except for the positional resolution. After processing, data is recorded at step #190 in FIG. 5.

In the second to the fourth embodiments described above, data of high usefulness is recorded with high precision. On the other hand, data of low usefulness is recorded with a reduced precision, thereby saving the memory capacity. In this connection, audio data in the high data volume processing mode is recorded at a low compression rate, while data in the low data volume processing mode is recorded at a high compression rate. That way, while saving the memory capacity, useful audio data is recorded with a high tone quality.

Fifth Embodiment

Figure 9:
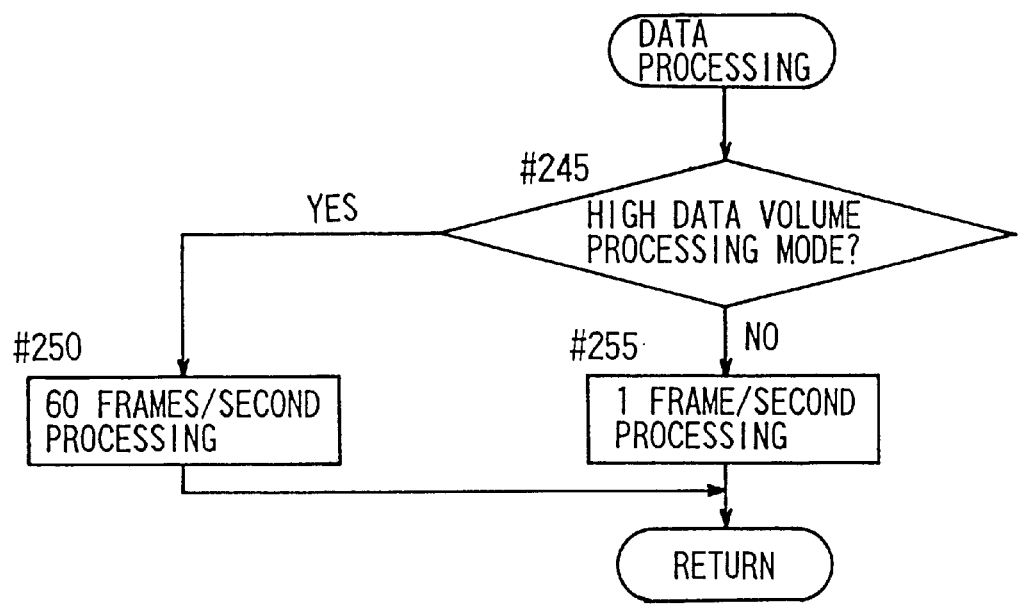
FIG. 9 is a flow chart of data processing operation of a controller of a fifth embodiment.

The fifth embodiment is identical with the second embodiment expected for the data processing by the controller 5 (step #185 in FIG. 5). FIG. 9 shows the flow chart of the data processing.

When data processing starts, the final set operation mode is first judged (step #245). In case the mode is set to the high data volume processing mode, image data is processed into data with 60 frames per second (step #250). In case the mode is set to the low data volume processing mode, image data is processed into data with one frame per second (step #255). In either mode, data is processed on the basis of preset conditions except for the recording rate. After processing, data is recorded at step #190 in FIG. 5.

In the present embodiment, data of high usefulness is recorded with a high time density. On the other hand, data of low usefulness is recorded with a reduced time density, thereby saving the memory capacity. Audio data is recorded in the same manner as in the second to the fourth embodiments.

Sixth Embodiment

Figure 10:
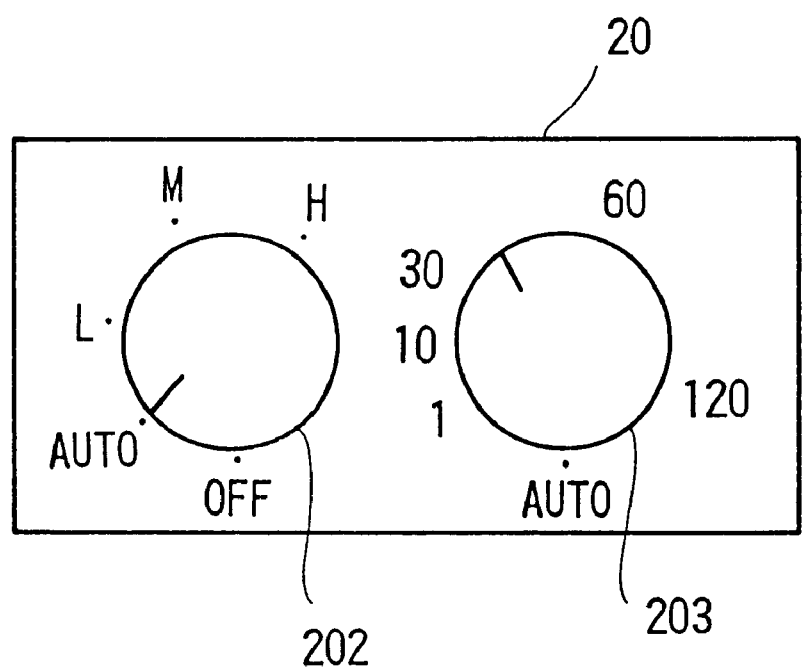
FIG. 10 is an exterior view of a manual switch of a sixth embodiment.

FIG. 10 is an exterior view of a manual switch unit 20 in the sixth embodiment. The manual switch unit 20 has two rotary switches—an image quality setting switch 202 and a recording rate setting switch 203. The image quality setting switch 202 is for setting quality of images represented by the image data having been processed (hereinafter referred to as processed image quality) and has five switching positions—OFF, AUTO, LOW (L), MIDDLE (M) and HIGH (H). The recording rate setting switch 203 is for setting the recording rate and has a switching position AUTO and switching positions corresponding to the natural numbers from one through one hundred twenty.

With the image quality setting switch 202 at the AUTO position, the processed image quality (determined by compression rate, color resolution, positional resolution values) are automatically set by the controller 5. At the position L, M and H positions, the processed image quality is set manually. L, M and H represent low image quality, middle image quality and high image quality, respectively. The values for the compression rate, color resolution, positional resolution for each image quality are predetermined. For a higher image quality, the compression rate is smaller with better color resolution and positional resolution. At the OFF position, the human body-mounted camera 1 is put out of operation.

With the recording rate setting switch 203 at the AUTO position, the recording rate is automatically set by the controller 5. With the switch 203 at the positions other than AUTO, the recording rate is set at the corresponding values. In the case shown in FIG. 10, the processed image quality is set to AUTO, and the recording rate is set at 40 frames/ second. The image quality setting switch 202 is so designed that the rotary part can be pressed down and that if that part is pressed down, one still image of high quality is recorded irrespective of the setting of the switches. That is, the image quality setting switch 202 works as a shooting button, too.

Figure 11:
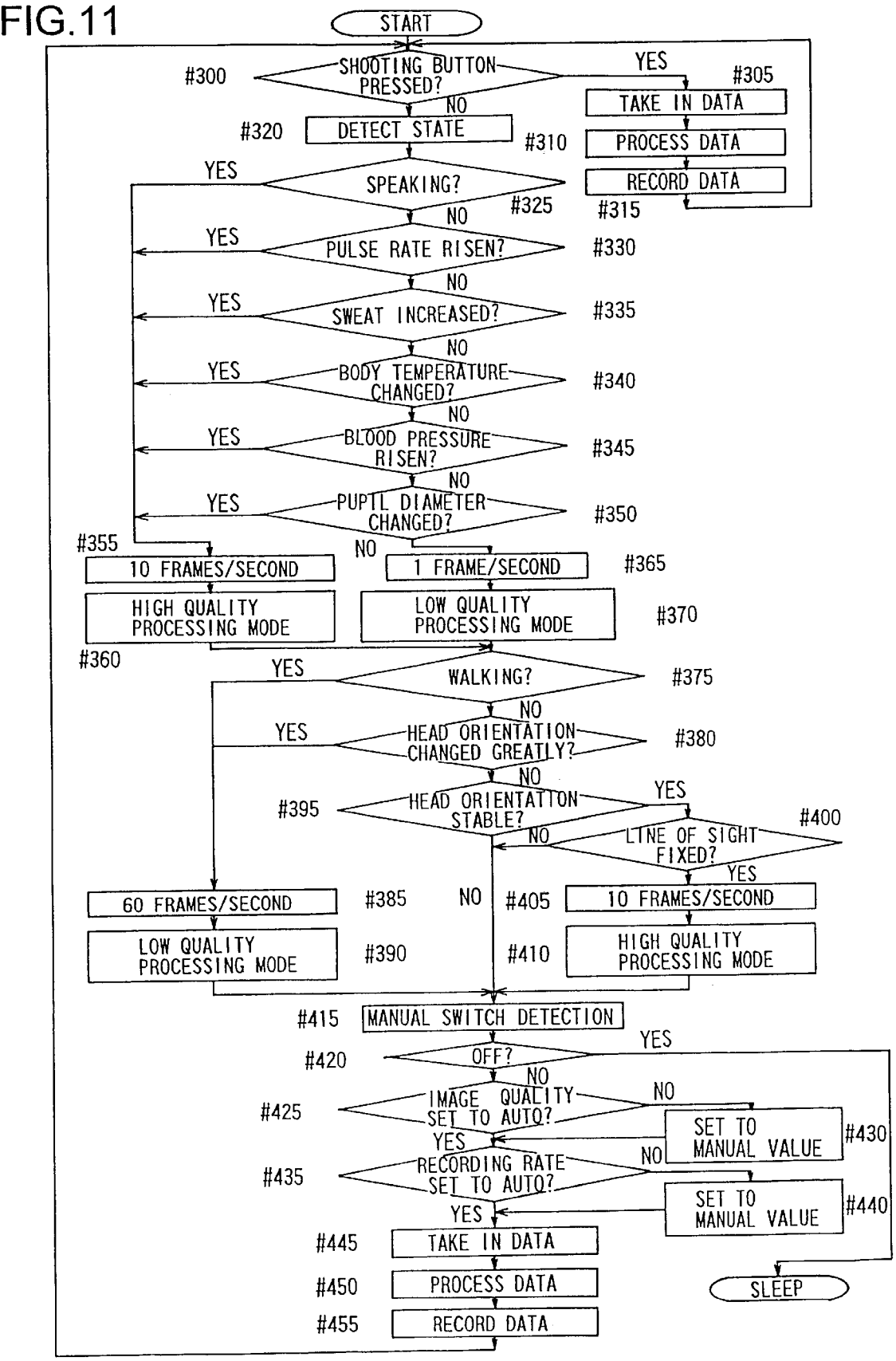
FIG. 11 is a flow chart of operation of a controller of the sixth embodiment.

FIG. 11 shows the flow chart of operation of the controller 5 of the present embodiment. When data processing starts, the controller 5 first judges whether the shooting button is pressed or not. (step #300). If the button is pressed down, image data is taken in (step #305), and the data is processed into data of high image quality (step #310) and recorded (step #315). This series of the steps records one still image of high quality. Then, the process returns to step #300.

If the shooting button is not pressed down, the motion state and physiological state of the wearer are detected (step #320). This step is the same as step #5 in FIG. 4. Then, judgements are made in steps #325 to #350. These judgements are identical with steps #10 to #35 in FIG. 4.

In case the result is YES in any of the judgement steps, the recording rate is set to 10 frames/second (step #355), and a high quality image processing mode is selected to set the processed image quality high (step #360). In case the result is NO in all the judgement steps, the recording rate is set to 1 frame/second (step #365), and a low quality image processing mode is selected to set the processed image quality low (step #370).

Then, it is judged whether the wearer is walking (step #375), and whether the quantity of change in head orientation is not lower than the first predetermined level (step #380). In case either of the results of judgement is YES, the recording rate is re-set to 60 frames/second (step #385), and the processed image quality is re-set to low (step #390). Then, the process proceeds to the step of manual switch detection (step #415). In case the results of judgement are both NO, it is judged whether the quantity of change in head orientation is not higher, than the second predetermined level (step #395) and whether the quantity of change in direction of line of sight is not higher than the predetermined level (step #400). In case the results of judgement are both YES, the recording rate is reset to 10 frames/second (step #405) and the processed image quality is re-set to high (step #410). Then, the process proceeds to manual switch detection (step #415). In case either of the results of judgement is NO, the process proceeds directly to manual switch detection (step #415).

In the manual switch detection (step #415), the set positions of two switches 202, 203 of the manual switch unit 20 are detected. In case the image quality setting switch 202 is set at OFF position (step #420), all the operations of the human body-mounted camera 1 are turned off. In case the image quality setting switch 202 and the recording rate setting switch 203 are both set at AUTO, the recording rate and processed image quality set in the previous steps are taken as final set values. In case it is judged that there is a switch not set at AUTO (steps #425, #435), the set manual values are taken as final set values (steps #430, #440).

Then, data is taken in (step #445), and is processed according to the final set values (step #450). And the processed data is recorded in the recording unit 12 (step #455), and the process returns to step #300. The controller 5 displays the shooting mode indicator LED 7 in red according to the final set value of the processed image quality. In case of high image quality, the shooting mode indicator LED 7 is turned on. In case of middle image quality, the shooting mode indicator LED 7 is turned on and off repeatedly. For low image quality, the shooting mode indicator LED 7 is turned off. That way, the wearer can know the processed image quality. Also, the shooting mode indicator LED 7 is displayed in green according to the final set value of the recording rate. For a higher rate, the display is turned on and off more frequently. That lets the wearer to know the recording rate.

In the present embodiment, data of high usefulness is recorded, in principle, at a high recording rate and with a high image quality. However, in case it is judged that there is much change in object of observation as when the wearer is walking or the quantity of change in head orientation is great, the recording rate is further raised, and images are recorded with a higher time density. Furthermore, in case there is a high possibility that the wearer is gazing at an object of observation as when the quantity of change in head orientation and direction of line of sight is small, images are always recorded with a high image quality. Through that control, images of high usefulness can be utilized more effectively. And with data of low usefulness, the memory capacity can be saved by reducing the volume of data in recording. In this connection, audio data is recorded at a compression rate corresponding to the compression rate of image data.

Obviously, many modifications and variations of the present invention are possible in light of the above teachings. It is therefore to be understood that within the scope of the appended claims, the invention may be practiced other than as specifically described.

What is claimed is:

1. A camera comprising:
    a shooting unit for shooting one or more images of an object in a plurality of operating modes, wherein said shooting unit can be worn by a user;
    a detector for automatically detecting a state of the user when said detector is being worn by the user;
    a selector for selecting an operation mode, based on the state detected by said detector, from among the plurality of operation modes provided for controlling said shooting unit, the operation modes differing from each other in at least one of power consumption, compression rate of the images, color of the images, resolution of the images, rate of shooting the images, and amount of image data; and
    a controller for controlling said shooting unit based on the operation mode selected by said selector.

2. A camera as claimed in claim 1,
    wherein said detector detects a physiological state of the user.

3. A camera as claimed in claim 1,
    wherein said detector detects at least one of orientation of the user's head;
    direction of line of sight;
    speaking condition;
    walking condition;
    pulse rate;
    blood pressure;
    body temperature;
    perspiration; and
    size of a pupil.

4. A camera as claimed in claim 1, further comprising:
    a recorder for recording a date and a time of shooting an image along with image data representative of the image.

5. A camera as claimed in claim 1, further comprising:
    an indicator for indicating to the user the operation mode selected by said selector.

6. A camera as claimed in claim 1, further comprising:
    a manual selector for selecting an operation mode from among said plurality of operation modes in accordance with a manual operation by the user.

7. A camera as claimed in claim 1, further comprising:
    a sound recorder for recording sound data, wherein said camera determines amount of sound data to be recorded based on the state detected by said detector.

8. A camera as claimed in claim 1, wherein the operation modes that differ in power consumption are due in part to a difference in a number of images recorded per unit of time.

9. A camera as claimed in claim 1, wherein the operation modes that differ in power consumption are due in part to the controller operating at a different operating frequency.

10. A camera comprising:
a shooting unit for shooting an image of an object, wherein said shooting unit can be worn by a user;
a detector for automatically detecting a state of the user when said detector is being worn by the user;
a selector for selecting an operation mode, based on the state detected by said detector, from among a plurality of operation modes provided for controlling said shooting unit; and
a controller for controlling said shooting unit based on the operation mode selected by said selector;
wherein said plurality of operation modes differ from each other in consumption of electricity and include an operation mode to suspend supply of electricity to said shooting unit.

11. A camera comprising:
a shooting unit for shooting one or more images of an object in a plurality of operating modes, wherein said shooting unit can be worn by a user;
a processor for processing image data representative of the images shot by said shooting unit;
a detector for automatically detecting a state of the user when said detector is being worn by the user;
a selector for selecting an operation mode, based on the state detected by said detector, from among the plurality of operation modes provided for controlling said processor, the operation modes differing from each other in at least one of power consumption, compression rate of the images, color of the images, resolution of the images, rate of shooting the images, and amount of image data to be recorded; and
a controller for controlling said processor based on the operation mode selected by said selector.

12. A camera as claimed in claim 11, wherein said detector detects a physiological state of the user.

13. A camera as claimed in claim 11, wherein said detector detects at least one of orientation of the user's head;
direction of line of sight;
speaking condition;
walking condition;
pulse rate;
blood pressure;
body temperature;
perspiration; and
size of a pupil.

14. A camera as claimed in claim 11, wherein a difference in the amount of image data to be recorded is due to a difference in at least one of
compression rate;
color resolution;
positional resolution; and
recording rate corresponding to a number of images recorded per unit time.

15. A camera as claimed in claim 11,
wherein the detector detects orientation of the user's head;
wherein a difference in the amount of image data to be recorded is due in part to a difference in a recording rate corresponding to a number of images recorded per unit time; and
wherein the recording rate is higher when amount of change in orientation of the user's head detected by said detector is equal to or greater than a predetermined value than when amount of the change is less than the predetermined value.

16. A camera as claimed in claim 11,
wherein the detector detects line of sight of the user;
wherein a difference in an amount of image data to be recorded is due in part to a difference in a positional resolution; and
wherein the positional resolution is higher when amount of change in direction of line of sight of the user detected by said detector is less than a predetermined value than when amount of the change is greater than the predetermined value.

17. A camera as claimed in claim 11, further comprising:
a recorder for recording a date and a time of shooting an image along with image data representative of the image.

18. A camera as claimed in claim 11, further comprising:
an indicator for indicating to the user the operation mode selected by said selector.

19. A camera as claimed in claim 11, further comprising:
a manual selector for selecting an operation mode from among said plurality of operation modes in accordance with a manual operation by the user.

20. A camera as claimed in claim 9, further comprising:
a sound recorder for recording sound data,
wherein said camera determines amount of sound data to be recorded based on the state detected by said detector.

21. A method of controlling a camera that is worn by a user, said method comprising:
a step of automatically detecting a state of the user by a detector worn by the user; and
a step of controlling, based on the state detected by said detector, at least one of a shooting unit for shooting one or more images of an object in a plurality of operating modes and a processor for processing image data representative of the image shot by said shooting unit;
wherein the step of controlling includes controlling at least one of power consumption, compression rate of the images, color of the images, resolution of the images, rate of shooting the images, and amount of image data.

22. A camera comprising:
a shooting unit for shooting one or more images of an object in a plurality of operating modes, wherein said shooting unit can be worn by a user;
a detector for automatically detecting a state of the user when said detector is being worn by the user;
a selector for automatically selecting an operation mode, based on the state detected by said detector, from among the plurality of operation modes provided for controlling said shooting unit; and
a controller for controlling said shooting unit based on the operation mode selected by said selector.

23. A camera comprising:
a shooting unit for shooting one or more images of an object in a plurality of operating modes, wherein said shooting unit can be worn by a user;

a processor for processing image data representative of the images shot by said shooting unit;

a detector for automatically detecting a state of the user when said detector is being worn by the user;

a selector for automatically selecting an operation mode, based on the state detected by said detector, from among the plurality of operation modes provided for controlling said processor; and a controller for controlling said processor based on the operation mode selected by said selector.

* * * * *